Oct. 14, 1952  J. E. KNIGHT  2,613,891
CONTROL SYSTEM AND VARIABLE LINKAGE THEREFOR
Filed July 16, 1949  2 SHEETS—SHEET 1

*INVENTOR.*
JAMES E. KNIGHT
BY
*Richard W. Treverton*
*ATTORNEY.*

Oct. 14, 1952     J. E. KNIGHT     2,613,891
CONTROL SYSTEM AND VARIABLE LINKAGE THEREFOR

Filed July 16, 1949     2 SHEETS—SHEET 2

INVENTOR.
JAMES E. KNIGHT
BY
Richard W. Treverton
ATTORNEY.

Patented Oct. 14, 1952

2,613,891

UNITED STATES PATENT OFFICE 2,613,891

CONTROL SYSTEM AND VARIABLE LINKAGE THEREFOR

James E. Knight, Columbus, Ohio, assignor to Curtiss-Wright Corporation, a corporation of Delaware Application July 16, 1949, Serial No. 105,115

13 Claims. (Cl. 244—87)

1

The present invention relates to a novel force and motion control linkage and to an airplane control system wherein the linkage is utilized to automatically apply a down-load upon the elevator control surface when the horizontal stabilizer surface is adjusted to compensate for rearward movement of the center of lift of the airplane relative to its center of gravity.

When the trailing edge wing flaps of certain present types of airplanes are lowered the resulting rearward movement of the center of lift causes a nose-heaviness greater than can be compensated for by trimming the elevator, and hence means are provided whereby the horizontal stabilizer may be adjusted to change its angle of incidence in a negative direction as the flaps are lowered. This is usually done by pivoting the stabilizer to the fuselage on a spanwise axis near the stabilizer's trailing edge and by providing means to adjust its forward portion downwardly when the wing flaps are lowered. However when the stabilizer is so adjusted the direction of the airstream over the elevator is changed in a manner such that the control force required to effect up-elevator movement becomes very light, so light at low airspeeds that the pilot does not obtain sufficient control "feel" of the elevator to safely control the airplane.

To overcome this difficulty the present invention provides a down-spring for the elevator, and a novel force and motion control linkage which operates by and upon adjustment of the stabilizer to apply an increasing amount of spring force as the elevator angle of incidence is changed from normal in a negative direction. In this way the control pressure required to cause up movement of the elevator at low airspeeds may be increased to the desired value while at normal flight airspeeds the spring load may be entirely removed so that the elevator control has the lightness of feel desired under this flight condition.

The mechanical force and motion control linkage, as applied to the control system referred to above, comprises two members pivoted to a common support and pivotally connected to each other by a link to which the down-elevator spring means are attached. The axes of the pivots of the two members to the common support are coincident when the stabilizer is in its up or normal flight position but are moved apart as the stabilizer is adjusted downwardly; and the point of attachment of the springs to the link is so located as to lie upon these axes when they are coincident. With this arrangement the spring means exert no moment upon the members, or

2 upon the elevator which is connected to one of them, in the up-stabilizer condition; but as the stabilizer is adjusted downwardly, separating the axes of the pivoted members, an increasing moment is applied to these members by the spring means, and through them is applied as a downforce to the elevator. The relative movement of the pivots of the two members is effected by having one of them carried by a swinging link mounted upon the aforementioned common support, and by connecting this link to the stabilizer in such manner that as the latter is adjusted the link is swung to move the pivots together or apart.

The foregoing and other objects and advantages of the invention will appear from the following description of the mechanism shown in the accompanying drawings, wherein.

Figure 6:
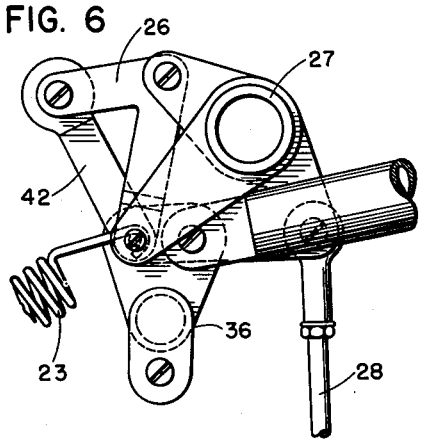
Figs. 4, 5 and 6 are plan views of the linkage means in the positions thereof when, with the stabilizer in its normal flight position, i. e. up position, the elevator is, respectively, in neutral position, in down position and in up position.
Figure 9:
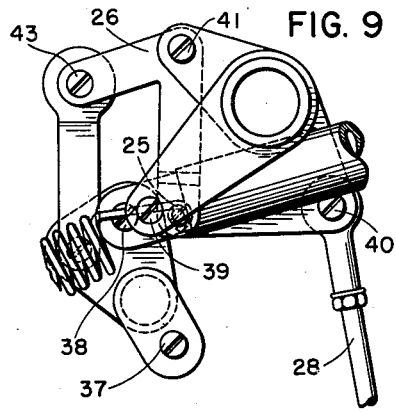
Figure 5:
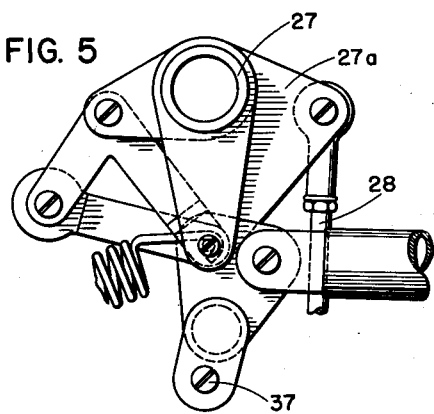
Figure 8:
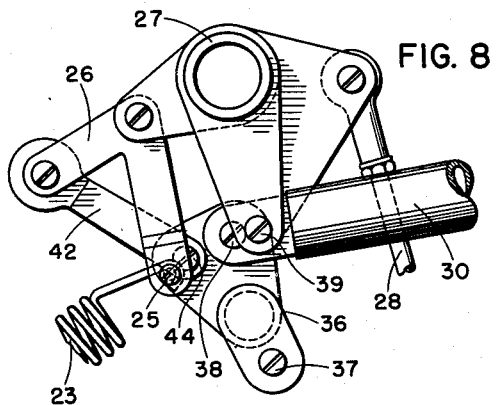
Figure 4:
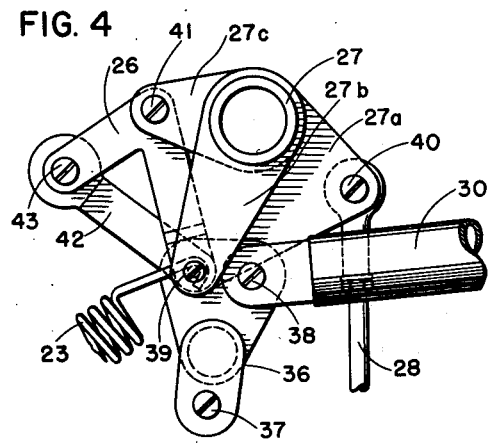
Figure 7:
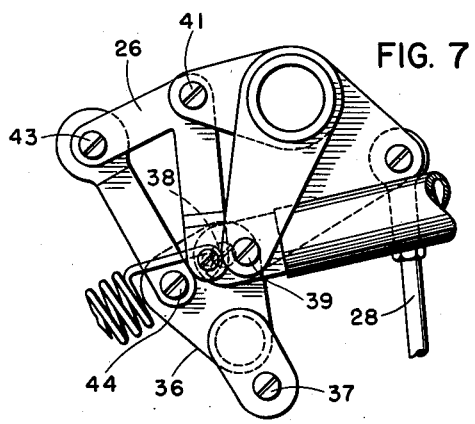

Figs. 7, 8, and 9 are plan views corresponding respectively to Figs. 4, 5, and 6, but in the positions thereof when the stabilizer is adjusted to its down position.

Figure 2:
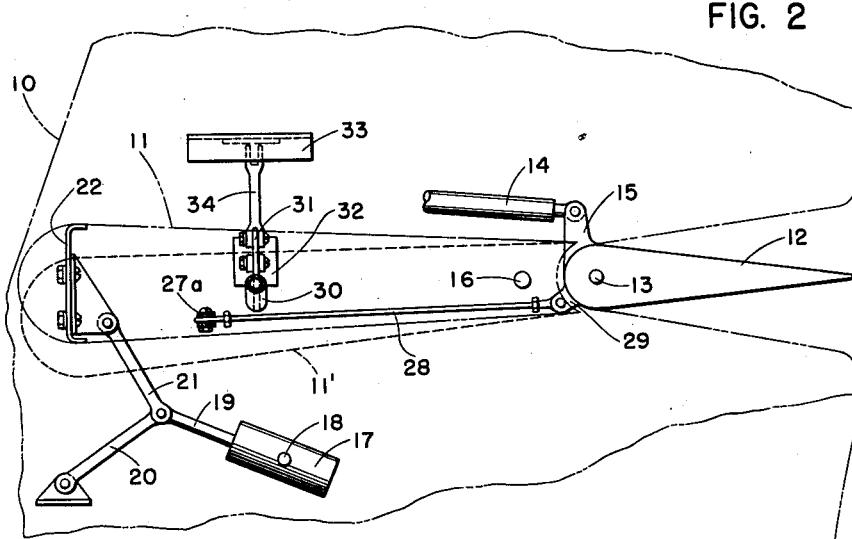
Fig. 2 is taken along line 2—2 of Fig. 1 with the outlines of the stabilizer and fin in their normal relative positions shown by broken lines, and with the position of the stabilizer when adjusted downwardly indicated by dotted lines.
Figure 1:
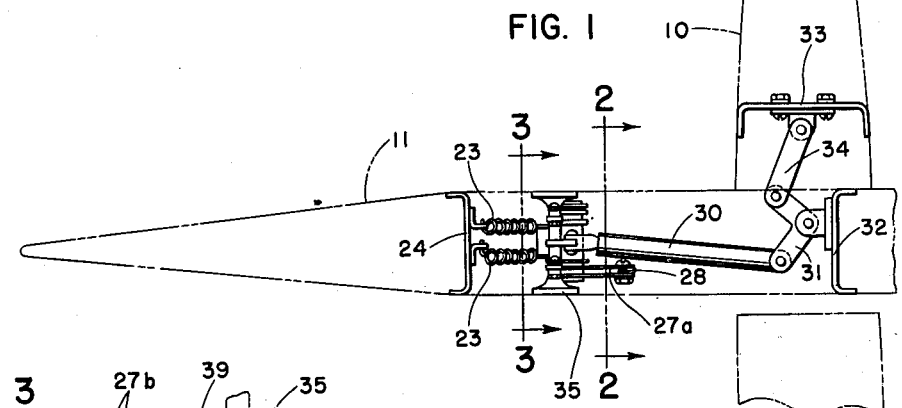
Fig. 1 is a rear elevational view of the control system, with the outline of the horizontal stabilizer and vertical fin of the airplane shown by broken lines.
Figure 3:
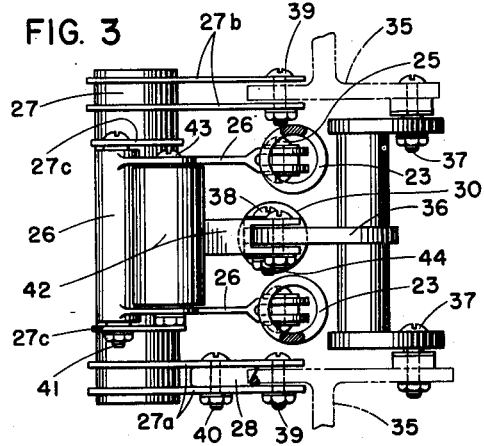
Fig. 3 is a view on a larger scale of the linkage means as the latter appears in the plane indicated by line 3—3 on Fig. 1.

In Figs. 1 and 2 the vertical fin of the airplane is designated 10, the horizontal stabilizer 11, and the elevator 12. The latter is movable about its hinge axis 13 by a push-pull rod 14 which is pivoted to elevator horn 15. The stabilizer is hinged at 16 on a spanwise axis so that its angle of incidence may be adjusted by suitable means such as by the hydraulic motor illustrated in Fig. 2 which has a cylinder 17 pivoted to the airplane fuselage at 18 and a piston rod 19 pivoted to the knee of a toggle. One link, 20, of the toggle is pivoted to the fuselage while the other link, 21, is pivoted to a fitting on the front spar 22 of the stabilizer. The arrangement is such that upon movement of the piston rod to the right as the parts appear in Fig. 1 the toggle will fold to lower the stabilizer toward its dotted line position indicated at 11', thereby changing its angle of incidence negatively. The motor may be operated in either direction by suitable means, not shown, controlled either manually by the pilot of the airplane or automatically by interconnection with the means for operating the wing flaps.

For applying a down-load on the elevator, parallel tensioned springs 23 are provided, one end of each spring being anchored to a structural part 24 of the stabilizer. The other end of each spring is anchored to a pin 25 extended across one of the forked ends of a double link 26 of the control linkage which is shown in detail in Figs. 3 to 9, inclusive. The tension load of the springs is transmitted from arms 27a of member 27 of the linkage through a pull rod 28 that is pivoted to horn 29 of the elevator. The linkage is controlled, to apply or remove the spring load from the elevator, by a push-pull rod 30. This rod is pivoted to one arm of a bellcrank lever 31 that is pivotally mounted upon a structural part 32 of the stabilizer. The other arm of the bellcrank lever is connected to a structural part 33 of the vertical fin 10 by a pivoted link 34, the arrangement being such that as the stabilizer is lowered the rod 30 is moved to the left, as the parts appear in Figs. 1 and 4 to 9, inclusive, and to the right as the stabilizer is raised.

The mechanical linkage shown in detail in Figs. 3 to 9 inclusive is carried by a fitting 35 that is affixed to and within the stabilizer 11. This linkage comprises four major components: First is a swinging link 36 pivoted to fixed fitting 35 by bolts 37 and pivoted to push-pull rod 30 by bolt 38. Second is the member 27 whose lower arms 27a and upper arms 27b are pivoted to fixed fitting 35 by bolts 39, and whose lower arms 27a are further pivoted by bolt 40 to pull rod 28. Third is member 42 that is pivoted by bolt 44 to link 36. And fourth is the double link 26 whose forked ends are connected by pins 25 to springs 23 and which serves as a connecting link between members 27 and 42, being pivoted by bolt 41 to arm 27c of member 27 and by bolt 43 to member 42.

The parts of the linkage system are so proportioned that the pivots 25 and 44 may be brought simultaneously into alignment with fixed pivots 39, and this is the condition depicted in Fig. 4 which exists when the stabilizer is in its normal flight or up position and the elevator is in its neutral position. So long as the stabilizer, acting through push-pull rod 30, holds the link 36 in its position wherein pivot 44 is aligned with fixed pivots 39, the members 42, 26 and 27 must move as a single unit about the axis of the fixed pivots and hence the pivots 25 carried by link 26 cannot move from alignment with this axis. Therefore the springs 23 are not affected by such rocking motion of members 42, 26 and 27 as occurs through the agency of pull rod 28 whenever the elevator is moved. Thus when the elevator is lowered members 42, 26 and 27 are moved to the position shown in Fig. 5 and when it is raised they are moved to the position shown in Fig. 6, but in both of these positions the pivots 25 remain in the neutral position shown in Fig. 4, so that the springs 23 are neither expanded nor contracted by elevator motion and act neither to resist nor to aid such motion.

However when the push-pull rod 30 swings the link 36 counterclockwise (as the parts appear in Figs. 4 to 9 inclusive) about fixed pivots 37, as a result of down movement of the stabilizer, the pivot 44 is displaced from the axis of fixed pivots 39. The linkage now becomes in effect a four-link system, with elements 36 and 35 constituting a stationary base link between the pivots 44 and 39 about which pivots the links 42 and 27 respectively may swing, and with link 26 constituting a pivoted connection between links 42 and 27. The tensioned springs 23 now act on connecting link 26 to urge shifting of links 42, 26 and 27 to the left or counter-clockwise about pivots 44 and 39. Since such shifting of the link 27 causes a pull on rod 28, it will be seen that the effect of the springs now is to place a down load on the elevator 12.

The effect of the springs upon the elevator when pivot 44 is displaced from the axis of pivots 39 is demonstrated in Figs. 7, 8 and 9. It will be seen that as rod 28 is moved from the position of Fig. 7 to that of Fig. 8 (down elevator movement) the springs 23 are contracted, and as rod 28 is moved from position of Fig. 7 to that of Fig. 9 (up-elevator movement) the springs 23 are elongated. The amount of travel of the ends of the springs anchored to pins 25 per unit of travel of rod 28, and hence the amount of down force applied by the spring means to the elevator, varies with the amount of displacement of pivot 44 from the axis of pivots 39. Hence if the stabilizer is moved only part way to the limit position shown at 11' in Fig. 2 the down-load applied by the spring means will be only a generally corresponding fraction of the load applied in such limit position. In this way the elevator stick loads may be kept reasonably uniform irrespective of the position of adjustment of the stabilizer.

The linkage means shown in Figs. 3 to 9 inclusive are susceptible of numerous uses other than as a control for an elevator down spring. For example consider link 30 to be a manually or power operable control element movable between the two limit positions of Figs. 4 and 7, consider rod 28 to be a push-pull link connected to any force applying means, and spring 23 to be a push-pull link extending to any device which is desired to be operated by the force applying means. So long as control element 30 remains in the position shown in Fig. 4, motion of link 28 will be ineffective to move link 23, which will therefore remain locked stationary. But when control element 30 is moved to the position shown in Fig. 7, reciprocating motion of rod 28 will be transmitted to link 23. It will be seen that rod 28 may either the operating or operated member and the member attached to pivots 25 either the operated or operating member, respectively.

Still other variations and modifications of the invention described herein will be obvious to persons skilled in the aeronautical and other mechanical arts, and accordingly it is to be understood that the foregoing disclosure is made by way of illustration and explanation of the inventive principles involved, and not by way of limitation.

I claim:

1. In combination with an airplane having an elevator and an adjustable stabilizer, an elevator load applying mechanism comprising: first and second elements pivoted respectively on first and second axes to a common support on the airplane, a third element pivoted to said first element on a third axis which may be brought into coincidence with said second axis by pivotal movement of the first element, a fourth element pivotally connecting the second and third elements, tensioned spring means pivotally connected to said fourth element upon an axis which is coincident with said second and third axes when the latter are coincident, a pull rod pivotally connecting said second element and said elevator for applying thereto, as a down load, force exerted by said spring means when said second and third axes are non-coincident, and means operable by and upon down adjustment of said stabilizer for moving the first element about said first pivot axis to displace said third axis from coincidence with said second axis.

2. In combination with an airplane having an elevator and an adjustable stabilizer, an elevator load applying mechanism comprising: first and second elements pivoted respectively on first and second axes to a common support on the airplane, a third element pivoted to said first element on a third axis which may be brought into coincidence with said second axis by pivotal movement of the first element, a link pivotally connecting the second and third elements, load applying means pivotally connected to said link upon an axis which is coincident with said second and third axes when the latter are coincident, a rod pivotally connecting said second element and said elevator for applying to the latter, force exerted by said load applying means when said second and third axes are non-coincident, and means operable by and upon adjustment of said stabilizer for moving the first element about said first pivot axis to shift said third axis in relation to said second axis.

3. In combination with an airplane having an elevator and an adjustable stabilizer, an elevator load applying mechanism comprising: first and second elements pivoted respectively on first and second axes to a common support on the airplane, a third element pivoted to said first element on a third axis which may be brought into coincidence with said second axis by pivotal movement of the first element, a link pivotally connecting the second and third elements, load applying means pivotally connected to said link upon an axis which is coincident with said second and third axes when the latter are coincident, means connecting said second element and said elevator for applying to the latter, force exerted by said load applying means when said second and third axes are non-coincident, and means operable by and upon adjustment of said stabilizer for moving the first element about said first pivot axis to shift said third axis in relation to said second axis.

4. In combination with an airplane having an elevator and an adjustable stabilizer, an elevator load applying mechanism comprising: first and second elements pivoted respectively on first and second axes to a common support on the airplane, a third element pivoted to said first element on a third axis which may be brought into coincidence with said second axis by pivotal movement of the first element, a link pivotally connecting the second and third elements, load applying means pivotally connected to said link upon an axis which is coincident with said second and third axes when the latter are coincident, one of said second and third elements being connected to the elevator for applying thereto, force exerted by said load applying means when said second and third axes are non-coincident, and means operable by and upon adjustment of said stabilizer for moving the first element about said first pivot axis to shift said third axis in relation to said second axis.

5. In combination with an airplane having a movable airfoil, mechanism for applying a load to the airfoil comprising: first and second elements pivoted respectively on first and second axes to a common support on the airplane, a third element pivoted to said first element on a third axis which may be brought into coincidence with said second axis by pivotal movement of the first element, a link pivotally connecting the second and third elements, load applying means pivotally connected to said link upon an axis which is coincident with said second and third axes when the latter are coincident, one of said second and third elements being connected to said airfoil for applying thereto, force exerted by said load applying means when said second and third axes are non-coincident, and means for moving the first element about said first pivot axis to shift said third axis in relation to said second axis.

6. In combination with an airplane having an elevator and an adjustable stabilizer, an elevator load applying mechanism comprising: a first member pivoted to a support on the airplane and a second member connected to said support by movable pivot means, said pivot means being movable to shift the pivot axis thereof into or out of coincidence with the axis upon which the first member is pivoted to said support, said second member being connected to the elevator for pivotal movement upon movement of the elevator, a link pivotally connecting said members, load applying means connected to the link at a point which is disposed along said axes when the latter are coincident, said load applying means applying a down load upon the elevator when said axes are non-coincident, and the stabilizer being connected to said movable pivot means for shifting the axis thereof out of such coincidence as the stabilizer is adjusted to change its angle of incidence negatively.

7. In combination with an airplane having an elevator and an adjustable stabilizer, an elevator load applying mechanism comprising: a first member pivoted to a support on the airplane and a second member connected to said support by movable pivot means, said pivot means being movable to shift the pivot axis thereof into or out of coincidence with the axis upon which the first member is pivoted to said support, one of said members being connected to the elevator for pivotal movement upon movement of the elevator, a link pivotally connecting said members, load applying means connected to the link at a point which is disposed along said axes when the latter are coincident, and the stabilizer being connected to said movable pivot means for shifting the axis thereof upon adjustment of the stabilizer.

8. In combination with an airplane having a movable airfoil, mechanism for applying load to said airfoil comprising: a first member pivoted to a support on the airplane and a second member connected to said support by movable pivot means, said pivot means being movable to shift the pivot axis thereof into or out of coincidence with the axis on which the first member is pivoted to said support, one of said members being connected to the airfoil for pivotal movement upon movement of said airfoil, a link pivotally connecting said members, load applying means connected to the link at a point which is disposed along said axes when the latter are coincident, and means for moving said movable pivot means for shifting the axis thereof.

9. In combination with an airplane having an elevator and an adjustable stabilizer, spring means connected to the elevator in a manner to exert a down load thereon in response to movement of the stabilizer from a predetermined position, means for varying said down load exerted on the elevator by said spring means, and an operating connection between the adjustable stabilizer and said varying means for operating the latter to increase said down load as the stabilizer is adjusted to change its angle of incidence in a negative direction.

10. A variable load applying mechanism comprising first and second elements pivoted respectively on first and second axes to a common support, a third element pivoted to the first element on a third axis which may be brought into coincidence with said second axis by pivotal movement of the first element, a link pivotally connecting the second and third elements, spring means pivoted to said link on a fourth axis which is coincident with said second and third axes when said axes are coincident, a member pivoted to said second element on an axis spaced from said second axis for transmitting from the second element load applied by said spring means when said second and third axes are non-coincident, and means for moving said first element about said first axis to shift said third axis into and out of coincidence with said second axis.

11. A variable load applying mechanism comprising first and second elements pivoted respectively on first and second axes to a common support, a third element pivoted to the first element on a third axis which may be brought into coincidence with said second axis by pivotal movement of the first element, a link pivotally connecting the second and third links, load applying means pivoted to said link on a fourth axis which is coincident with said second and third axes when said axes are coincident, movement of said first element about said first axis shifting said third axis toward and from coincidence with said second axis for respectively decreasing and increasing the moment of said load applying means upon said second and third elements.

12. A variable motion transmitting mechanism comprising first and second elements pivoted respectively on first and second axes to a common support, a third element pivoted to the first element on a third axis which may be brought into coincidence with said second axis by pivotal movement of the first element, a link pivotally connecting the second and third elements, a first member pivoted to said link on a fourth axis which is coincident with said second and third axes when the latter axes are coincident, a second member pivoted to one of said second and third elements, and means for moving said first element about said first axis to shift said third axis into and out of coincidence with said second axis, the movement of the first member relative to movement of the second member decreasing to zero as second and third axes become coincident.

13. A variable motion transmitting mechanism comprising first and second elements pivoted respectively on first and second axes to a common support, a third element pivoted to the first element on a third axis which may be brought into coincidence with said second axis by pivotal movement of the first element, a link pivotally connecting the second and third elements, a member pivoted to said link on a fourth axis which is coincident with said second and third axes when the latter axes are coincident, movement of said first element about said first axis shifting said third axis toward and from coincidence with said second axis for respectively decreasing and increasing the movement of said member in relation to the movement of said second and third elements.

JAMES E. KNIGHT.

REFERENCES CITED

The following references are of record in the file of this patent:

UNITED STATES PATENTS

| Number | Name | Date |
|---|---|---|
| 1,702,184 | Uwins | Feb. 12, 1929 |
| 2,094,488 | Gwinn | Sept. 28, 1937 |